May 22, 1951  G. L. CLAYBOURN ET AL  2,554,240
OUTDOOR METAL-CLAD SWITCHGEAR
Filed April 30, 1947  2 Sheets-Sheet 1

WITNESSES:
E. A. McCloskey
N. C. Philcot

INVENTORS
Glen L. Claybourn
and Paul Kocsis, Jr.
BY
G. M. Crawford
ATTORNEY

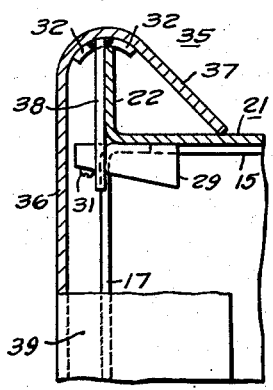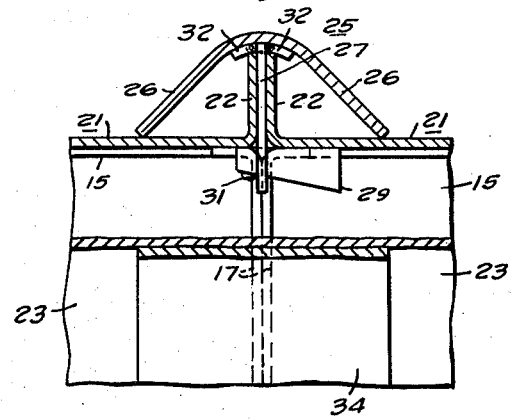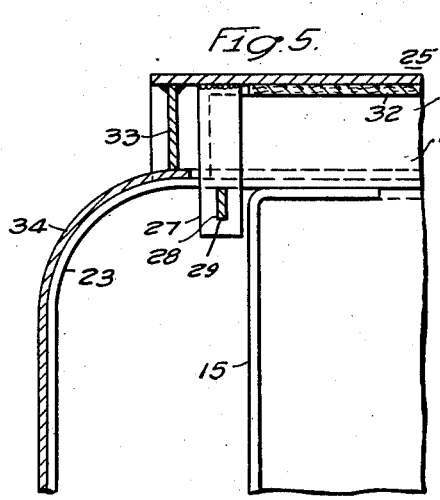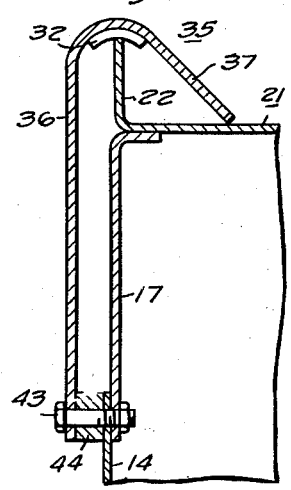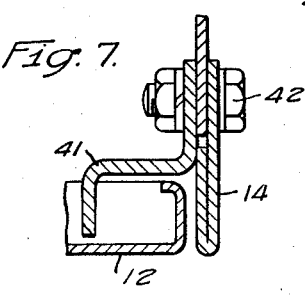

UNITED STATES PATENT OFFICE 2,554,240

OUTDOOR METAL-CLAD SWITCHGEAR

Glen L. Claybourn and Paul Kocsis, Jr., Pittsburgh, Pa., assignors to Westinghouse Electric Corporation, East Pittsburgh, Pa., a corporation of Pennsylvania Application April 30, 1947, Serial No. 744,806

2 Claims. (Cl. 108—21)

Our invention relates, generally, to metal-clad switchgear and, more particularly, to a roof structure for metal-clad switchgear of the unit type suitable for outdoor service, and other equipment of a similar nature.

An object of our invention, generally stated, is to provide a roof structure for metal-clad switchgear and the like which shall afford sufficient protection against the elements and which may be readily manufactured and assembled.

A more specific object of our invention is to protect the roof joint seam between units of metal-clad switchgear from wind-blown rain, snow and dust.

Another object of our invention is to protect the roof joint seam between metal-clad switchgear units from seepage from melting snow on the roof.

A further object of our invention is to provide for holding a protective covering plate for a roof joint seam in place without requiring holes through the roof sheets or the covering plate.

Still another object of our invention is to provide a roof structure for metal-clad switchgear which shall permit additional units to be added readily to a switchgear assembly.

Other objects of our invention will be explained fully hereinafter or will be apparent to those skilled in the art.

In accordance with one embodiment of our invention, the longitudinal edges of the roof sheet for a metal-enclosed switchgear unit are bent at right angles to and upwardly from the roof surface. Sealing plates are provided for the roof seams between the units of a complete assembly and trim plates are provided for the end flanges. The sealing and trim plates may be held in position by wedges driven through slotted tongues secured to the bottom surface of the plates. The wedges draw the plates tightly against the top surface of the roof sheets. The trim plates may be bolted to the side sheets of the housing if desired.

For a better understanding of the nature and objects of our invention, reference may be had to the following detailed description, taken in conjunction with the accompanying drawings, in which:

Fig. 3 is an enlarged detail view, partly in section and partly in elevation, of a portion of the structure;

Figs. 4 and 5 are views, similar to Fig. 3 of other portions of the structure;

Fig. 6 is a view, similar to Fig. 3, showing a modification of the invention, and Fig. 7 is an enlarged view, in section, taken along the line VII—VII of Fig. 2.

Figure 1:
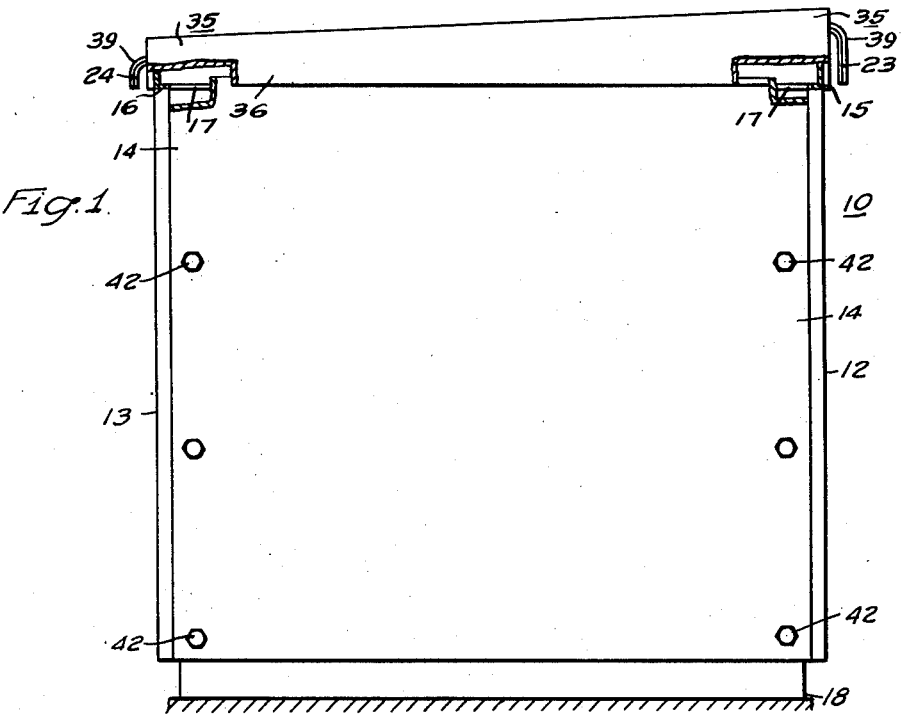
Figure 1 is a view, in side elevation, of a metal-enclosed switchgear structure embodying the principal features of our invention, portions of the structure being broken away for clearness.
Figure 2:
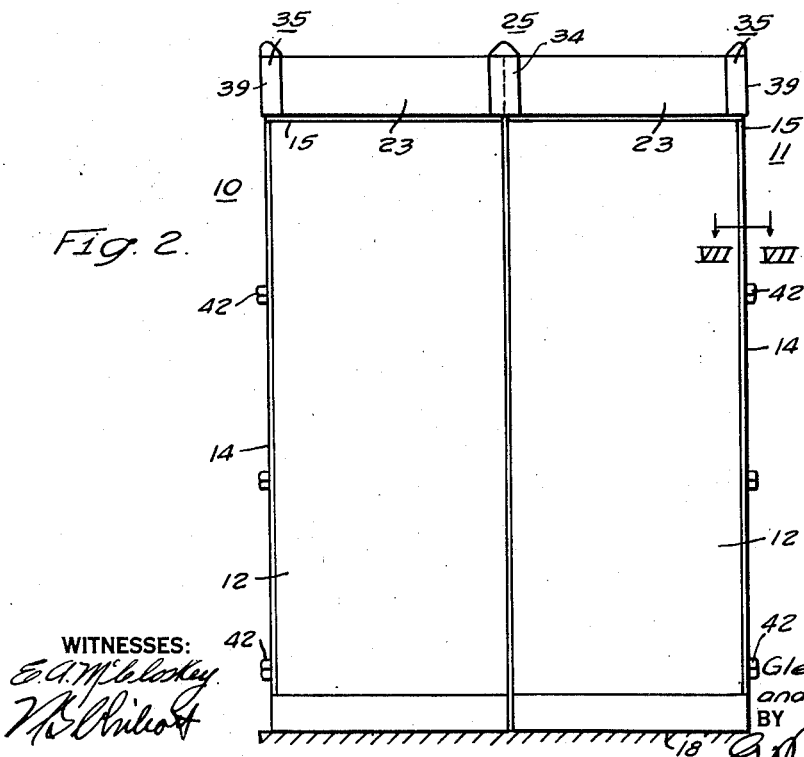
Fig. 2 is a view, in front elevation, of the structure shown in Fig. 1.

Referring to the drawings and particularly to Figs. 1 and 2, the structure shown therein comprises a pair of metal-clad switchgear units 10 and 11 which are disposed in side-by-side relation. The units are of a type which is suitable for outdoor service, the switchgear apparatus being enclosed in sheet metal housings.

As shown, each housing may be provided with a hinged door 12 at the front and a similar door 13 at the rear. The main portion of the housings may be constructed in the usual manner by mounting side plates 14 and the doors 12 and 13 on a metal framework (not shown). Channel members 15 and 16 may be provided above the doors 12 and 13, respectively. Angle members 17 may also be provided above the side plates 14. The entire structure may be mounted upon a suitable base 18.

In order to protect the apparatus within the housings against the elements and at the same time make it possible to readily add additional units to the assembly when desired, we have devised the roof structure herein described and illustrated. As shown most clearly in Figs. 3, 4 and 5, the roof structure comprises a metal roof sheet 21 for each housing unit. The sides of each roof sheet 21 are bent at right angles to and upwardly from the roof surface to form flanges 22.

As shown in Figs. 1 and 5, the ends of each roof sheet 21 extend beyond the unit enclosure at both the front and the rear of the housing and are bent downwardly to provide drip edge extensions 23 and 24 at the front and the rear of the housing, respectively. The roof sheets may be made removable by spot welding studs (not shown) to the underside at locations which permit bolting the sheets down to holding lugs inside of the housings, or they may be secured in any other suitable manner.

As shown in Fig. 4, the seam between the flanges 22 on adjacent units may be sealed by an angle-shaped metal plate 25 having legs 26 of equal length. The sealing plate 25 may be retained in position by tongue plates 27 which are secured to the sealing plate 25 and are disposed between the flanges 22.

The tongue plates 27 extend below the bottom surface of the roof sheets 21 and are provided with slots 28 through which wedges 29 are driven. A screw 31 may be inserted in each wedge 29, as shown in Figs. 3 and 4, to retain the wedges in position. Strips of felt 32, or similar material, may be cemented on the underside of the sealing plate 25 on each side of the tongue plates 27 to close the joint between the flanges 22 and the sealing plate 25.

It will be seen that the upwardly extending flanges 22 effectively prevent moisture from seeping into the housing. The sealing plate 25 prevents wind-blown rain, snow or dirt from entering the housing through the joint between the two flanges.

As shown in Fig. 5, a baffle plate 33 may be provided at each end of the angle-shaped plate 25 to close the ends of the sealing plate. The opening between the downwardly bent ends of adjacent roof sheets 21 may be closed by a formed sheet metal cover strip 34 which may be bolted to the drip edge of the roof sheets and extends under the lower edge of the end baffle plates 33. The baffle plates 33 may be welded to the inside of the angle-shaped sealing plate 25. The shape and contour of the sealing plate is maintained by the baffle plates which are cut to fit inside of the sealing plate.

As shown most clearly in Figs. 2 and 3, the outside flanges 22 of the roof sheets may be covered by trim plates 35. The trim plates 35 are also angular in shape but, as shown, one leg 36 is considerably longer than the other leg 37. The outside leg 36 extends down over the angle 17 of the housing.

Each trim plate 35 may be retained in position in a manner similar to the sealing plate 25. Tongue plates 38 are secured to the trim plate and are disposed adjacent the outside flange 22. The wedges 29 may be driven through the slotted tongue plates 38 underneath the surface of the roof sheet 21, thereby holding the trim plate in position. The felt strips 32 may be provided for sealing the joint between the trim plate 35 and the upper edge of the flange 22. As shown in Fig. 2, cover plates 39 may be provided for the ends of the trim plates 35. The cover plates 39 may be held in position in the same manner as the cover plates 34.

As shown in Fig. 7, the joint at one edge of the door 12 may be quite effectively sealed by a Z bar 41 which is bolted in position by bolts 42. In this manner the apparatus inside of the housings is well protected against the elements.

In the modification of the invention shown in Fig. 6, the tongue plates 38 and wedges 29 are omitted and the leg 36 of the trim plate 35 is bolted to the side plate 14 of the housing by bolts 43. A combined spacing and sealing strip 44 may be disposed between the leg 36 and the side plate 14. The strip 44 may be secured in position by the bolts 43.

It will be seen that, if desired, a roof sheet may be replaced by another sheet having bushings therein for making electrical connections to apparatus within a housing. Furthermore, the removal of a unit or the installation of additional units to the complete assembly may be readily done at any time. The joint between the old units and the additional unit may be sealed in the manner herein described. Also, since the trim and sealing plates are held in position by means of wedges, it is not necessary to provide holes through the roof members or the trim and sealing plates to secure them in position.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. A roof structure comprising, a roof sheet having upwardly bent flanges at its sides and downwardly bent flanges at its ends, a trim plate for each outer side flange, said trim plates having angularly disposed legs, tongue plates secured to the trim plates between said legs, said tongue plates extending below the bottom surface of the roof sheets and having slots in their subtending portions, wedges disposed in the slots in said tongue plates underneath the end flanges to retain the trim plates in position, the outer legs of the trim plates being longer than the inner legs and extending below said wedges, said inner legs only engaging the roof sheets, and said wedges engaging the roof sheets underneath the inner legs.

2. A roof structure for a switchgear unit comprising a roof sheet having upwardly bent flanges at its sides, a trim plate for each outside flange, said trim plates having angularly disposed legs, tongue plates secured to said trim plates between said legs, said tongue plates extending below the bottom surface of the roof sheets and having slots in their subtending portions, and wedges disposed in the slots in said tongue plates to retain the trim plates in position, the outer legs of the trim plates being longer than the inner legs and disposed substantially parallel to the tongue plates, said inner legs only engaging the roof sheets, and said wedges engaging the roof sheets underneath the inner legs.

GLEN L. CLAYBOURN.
PAUL KOCSIS, Jr.

REFERENCES CITED

The following references are of record in the file of this patent:

UNITED STATES PATENTS

| Number | Name | Date |
| --- | --- | --- |
| 185,715 | Allison | Dec. 26, 1876 |
| 448,244 | Lamont | Mar. 17, 1891 |
| 1,489,274 | Petty | Apr. 8, 1924 |
| 1,506,442 | O'Hara | Aug. 26, 1924 |
| 1,635,147 | Bloss | July 5, 1927 |
| 2,064,276 | Strattard | Dec. 15, 1936 |